United States Patent [19]

Liao

[11] Patent Number: 5,475,282
[45] Date of Patent: Dec. 12, 1995

[54] DUAL-COIL TYPE CRT IMAGE TILT CORRECTING DEVICE

[75] Inventor: Steve Liao, Tao-Yuan Shien, Taiwan

[73] Assignee: EFA Corporation, Tao-Yuan Shien, Taiwan

[21] Appl. No.: 108,172

[22] Filed: Aug. 18, 1993

[51] Int. Cl.⁶ ................................................ H01J 29/70
[52] U.S. Cl. ............................ 313/440; 313/431; 313/413; 335/213; 335/299
[58] Field of Search ......................... 313/440, 413, 313/431, 433; 348/829, 830, 831; 335/210, 213, 296, 299, 284

[56] References Cited

U.S. PATENT DOCUMENTS

| | | | |
|---|---|---|---|
| 3,573,525 | 6/1971 | Fuse | 313/440 X |
| 4,992,697 | 2/1991 | Penninga et al. | 313/440 |
| 5,170,094 | 12/1992 | Giannantonio et al. | 335/213 X |

*Primary Examiner*—Sandra L. O'Shea
*Assistant Examiner*—Ashok Patel
*Attorney, Agent, or Firm*—Browdy and Neimark

[57] ABSTRACT

A dual-coil type CRT image tilt correcting device which includes a first ring coil mounted on the CRT of a monitor in front of the biased yoke and charged to produce a magnetic field for tilt correction control without causing much color change, and a second ring coil mounted on the CRT adjacent to the magnetic ring of the biased yoke and charged to produce a magnetic field in the reversed direction to compensate with the magnetic field of the first ring coil on the convergence of the electron beam.

2 Claims, 4 Drawing Sheets

DUAL-COIL TYPE CRT IMAGE TILT CORRECTING DEVICE

BACKGROUND OF THE INVENTION

The present invention relates to a dual-coil type CRT image tilt correcting device which uses two ring coils respectively charged to produce reversed magnetic fields for correcting the tilt angle of the electron beam without causing a convergence error.

In a normal monitor, a bias coil is energized by electric current of saw-tooth wave to produce a magnetic field for biasing the electron beam. Because the earth has a magnetic field, it will interfere with the magnetic field of the biased coil to affect the biasing of the electron beam. Further, the strength of the magnetic field of the earth varies with the locations, the tilt angle and convergence of the electron beam will be different when a standard monitor is used in different locations. Therefore, the magnetic ring of the biased coil must be properly adjusted. However, it is not easy to adjust the magnetic ring of the biased coil. Only an experienced professional person can do the job.

SUMMARY OF THE INVENTION

The present invention has been accomplished under the aforesaid circumstances. It is therefore the principal object of the present invention to provide a dual-coil type CRT image tilt correcting device which is easy and safe to correct the tilt angle of the electron beam without causing a convergence error. The present invention uses two ring coils to produce reversed magnetic fields that compensate each other. Using a single ring coil to produce a magnetic field for correcting the tilt angle of the electron beam may cause a convergence error or color error. Therefore, a second ring coil is used to provide a reversed magnetic field which compensates the magnetic field of the first ring coil so that the tilt angle can be adjusted without causing any convergence or color error. As DC voltage is used to energize the ring coils, the intensity of the magnetic field of either ring coil can be regulated through a respective adjustment knob, and therefore the correction is easy and safe.

DETAILED DESCRIPTION OF THE PREFERRED EMBODIMENT

Figure 1:
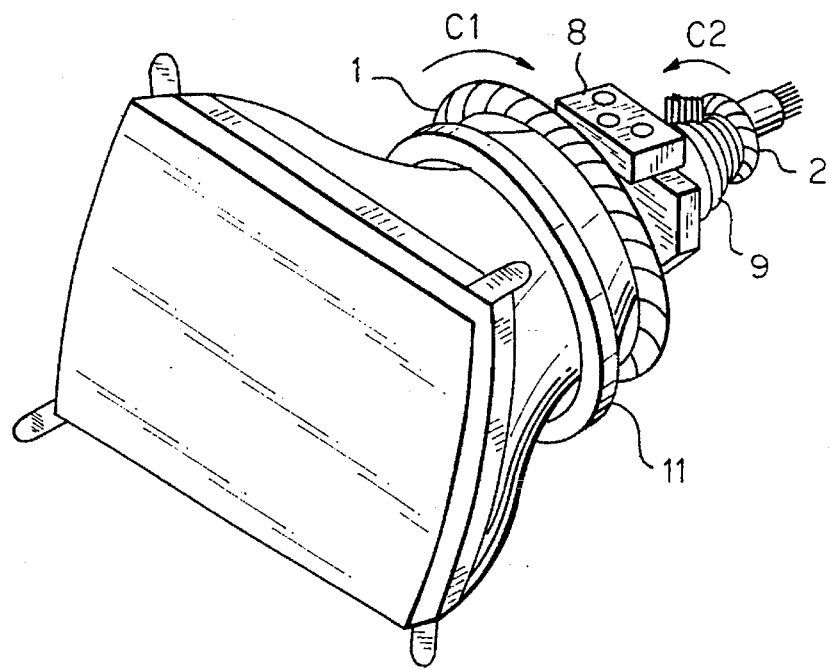
FIG. 1 is an installed view of the present invention showing the positions of the first and second ring coils on the cathode ray tube relative to the biased yoke.
Figure 2:
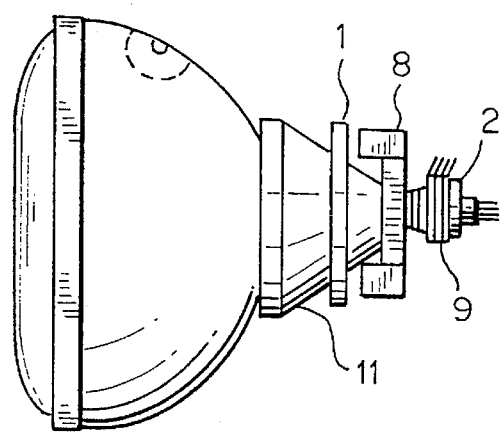
FIG. 2 is a side plan view of the cathode ray tube shown in FIG. 1.

Referring to FIGS. 1 and 2, the present invention comprises a first ring coil 1 and a second ring coil 2 respectively mounted on the CRT (cathode ray tube) and charged with a DC voltage to produce a respective magnetic field in a respective fixed direction for controlling the tilt and convergence of the image. A member 11 surrounds the CRT tube.

Figure 3:
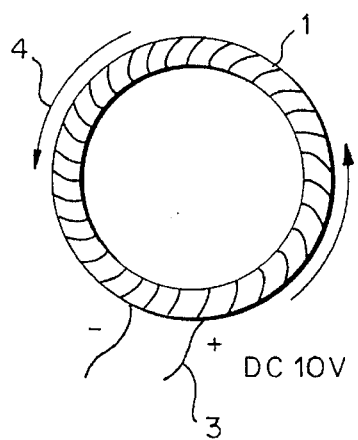
FIG. 3 illustrates the first ring coil energized to produce a magnetic field increasing the tilt angle in the counter-clockwise direction.
Figure 3:
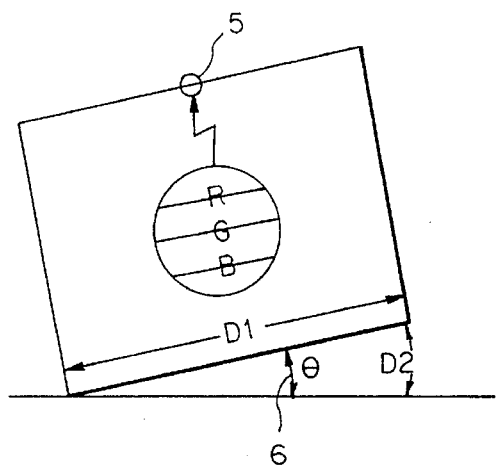

Referring to FIG. 3, as the first ring coil 1 is charged with a DC voltage 3 with the positive pole disposed on the right side and the negative pole disposed on the left side, a magnetic field 4 is produced in the counter-clockwise direction, causing the image to tilt at a tilt angle Θ6, and therefore the electron beam 5 is converged toward the direction of the magnetic field 4.

Figure 4:
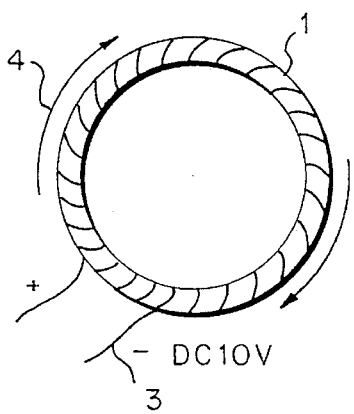
FIG. 4 illustrates the first ring coil energized oppositely.
Figure 4:
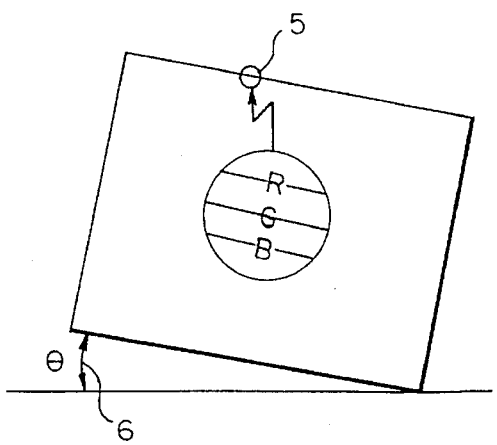

Referring to FIG. 4, as the first ring coil 1 is charged with a DC voltage 3 with the negative pole disposed on the right side and the positive pole disposed on the left side, a magnetic field 4 is produced in the clockwise direction, causing the image to tilt at a tilt angle Θ 6, and therefore the electron beam 5 is converged toward the direction of the magnetic field 4.

Figure 5:
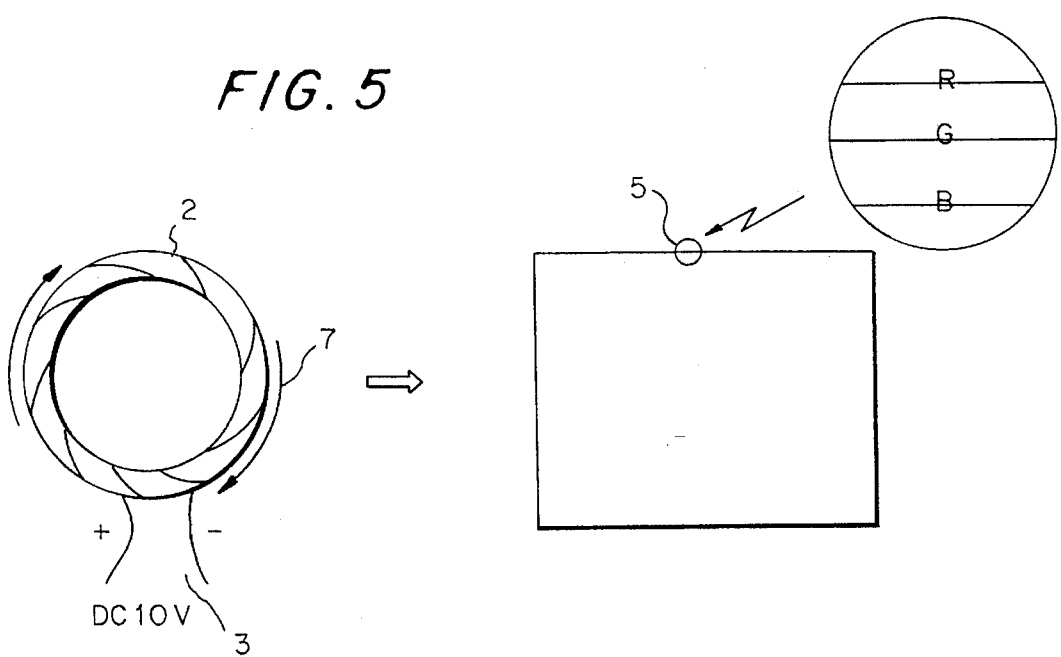
FIG. 5 shows the second ring coil.

Referring to FIG. 5, as the second ring coil 2 is charged with a DC voltage 3 with the negative pole disposed on the right side and the positive pole disposed on the left side, a magnetic field 7 is produced in the clockwise direction to affect the convergence of the electron beam 5.

Figure 6:
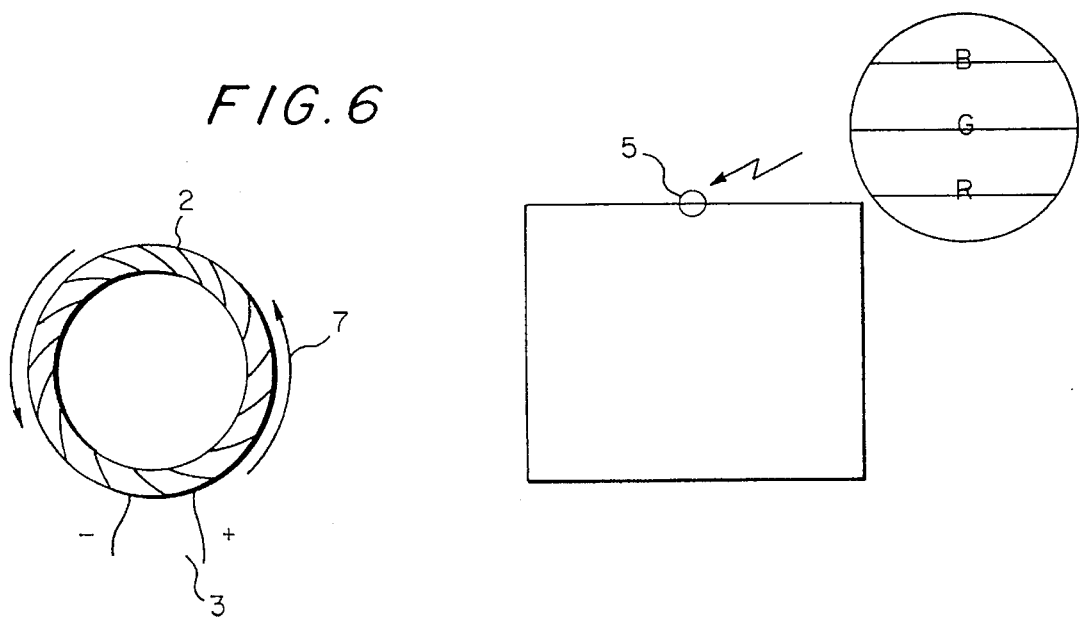
FIG. 6 shows the second ring coil.

Referring to FIG. 6, as the second ring coil 2 is charged with a DC voltage 3 with the positive pole disposed on the right side and the negative pole disposed on the left side, a magnetic field 7 is produced in the counter-clockwise direction to affect the convergence of the electron beam 5.

Figure 7:
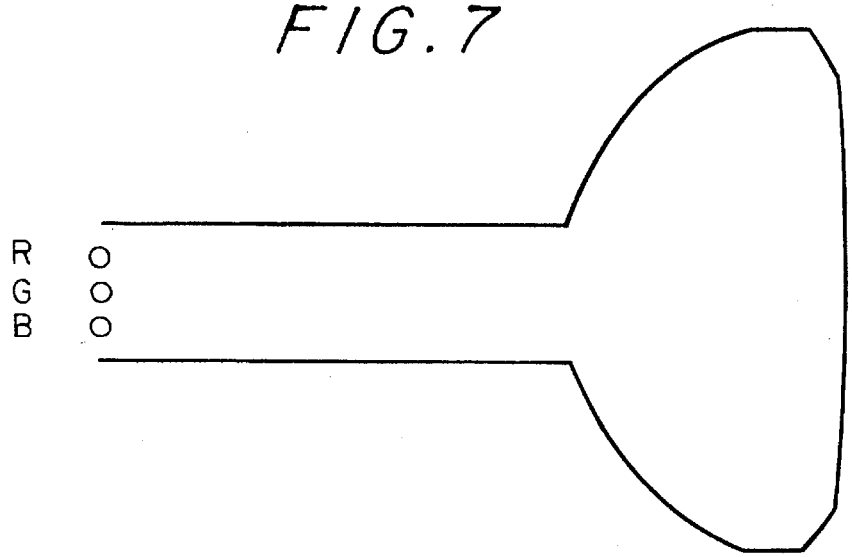
FIG. 7 is a schematic view of a CRT tube showing red, green, and blue electron guns.
Figure 8:
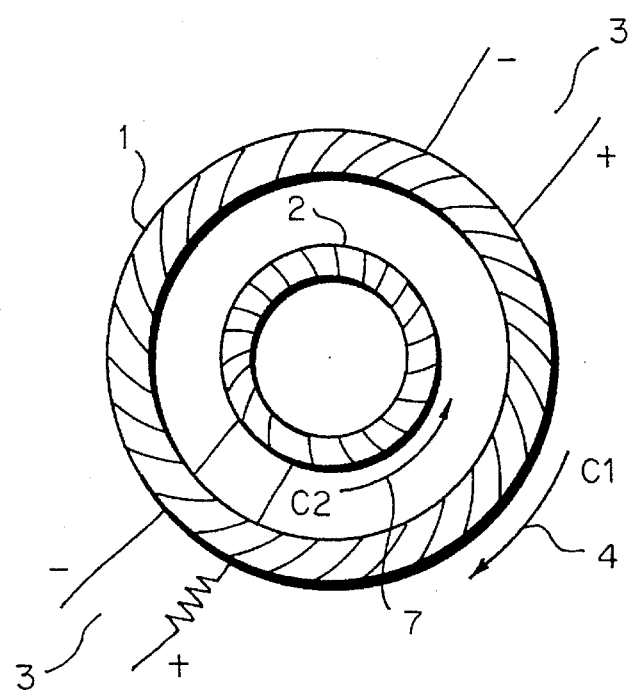
FIG. 8 depicts both coils of the invention.

Referring to FIGS. 7 and 8, the magnetic flux is relatively increased as the ring coil 1 or 2 is increased in size; conversely, the magnetic flux is relatively reduced as the ring coil 1 or 2 is reduced in size. Therefore, the electron beam 5 can be controlled to bias toward the direction of the magnetic field 4 or 7. Because the CRT of a monitor is arranged in a line as shown in FIG. 7, and the direction of the additional magnetic field is closer to R or B, the problems of convergence error and color error tend to happen while correcting the tilt angle. The error will become worse as the tilt angle is increased due to an increased magnetic field. The arrangement of the first and second ring coils 1;2 eliminates the aforesaid problems. The first ring coil 1 is provided for tilt correction. If the first ring coil 1 is disposed closer to the front end of the CRT, the problem of color error tends to happen. The problem of color error can be reduced to a minimum as the first ring coil 1 is disposed closer to the biased yoke 8. However, simply disposing the first ring coil 1 closer to the biased yoke 8 will affect the convergence of the electron beam. The convergence of the electron beam can be changed by mounting the second ring coil 2 on the CRT and disposed closer to the magnetic ring 9 of the biased yoke 8. By means of the reciprocal compensation between the reversed magnetic fields of the first and second ring coils 1;2, the tilt angle can be increased without causing any convergence or color error.

Because there is a 25 KV high voltage inside the monitor, it is dangerous to touch the inside of the monitor. Further, adjusting the magnetic ring 9 of the biased yoke 8 is not so easy. While adjusting the magnetic ring 9 to correct the tilt angle, the convergence and color of the electron beam may be affected. Therefore, it needs special techniques to adjust the magnetic ring 9. Because DC voltage is connected to the first and second ring coils 1;2 to produce magnetic fields, control knobs can be mounted on the front panel of the monitor and connected to the first and second ring coils 1;2 by lead wires for regulating the strength of the respective magnetic fields. Because the first and second ring coils 1;2 are made to compensate each other, no convergence error or color error will happen as the tilt angle is corrected. As DC voltage is used, the correction control is safe.

While only one embodiment of the present invention has been shown and described, it will be understood that various modifications and changes could be made without departing from the spirit and scope of the invention.

What is claimed is:

1. In a dual-coil cathode ray tube having means for coupling to a voltage source, a front screen, a rear portion emitting an electron beam in a forward direction toward the screen, a biased yoke disposed about the electron beam, and a magnetic ring of the biased yoke disposed rearward of the biased yoke, wherein the electron beam has a tilt angle and a convergence, an image tilt correcting device comprising:

a first ring coil mounted on the cathode ray tube in front of the biased yoke of the cathode ray tube;

a second ring coil mounted on the cathode ray tube rearward of the biased yoke and proximal to the magnetic ring;

said first ring coil and said second ring coil each being wound such that a first magnetic field in a counter-clockwise sense to the forward direction is produced by a first polarity of DC voltage, causing the image to tilt at a first tilt angle for allowing the electron beam to be converged toward the direction of the first magnetic field, and a second magnetic field in a clockwise sense to the forward direction is produced by a second polarity of DC voltage, causing the image to tilt at a second tilt angle opposite to the first angle for allowing the electron beam to be converged toward the direction of the second magnetic field;

said first ring coil and said second ring coil being charged to produce magnetic fields in the clockwise sense and the opposing counter-clockwise sense for controlling the tilt angle and the convergence of the electron beam;

magnetic flux being relatively increased as selectively the first ring coil and the second ring coil is increased in size and conversely the magnetic flux being relatively decreased as selectively the first ring coil and the second ring coil is decreased in size, such that the electron beam can be controlled to bias toward the direction of the magnetic field of selectively the first ring coil and the second ring coil.

2. The image tilt correcting device according to claim 1, further comprising control knobs mountable on a monitor housing for the cathode ray tube, the control knobs connected respectively to the first ring coil and the second ring coil for regulating strengths of the magnetic fields.

\* \* \* \* \*